(12) United States Patent
Al-Shyoukh et al.

(10) Patent No.: US 9,367,072 B2
(45) Date of Patent: Jun. 14, 2016

(54) AC-DC CONVERTERS AND METHOD WITH SOFT-START SCHEME FOR AC-DC CONVERTERS

(71) Applicant: TAIWAN SEMICONDUCTOR MANUFACTURING COMPANY, LTD., Hsinchu (TW)

(72) Inventors: Mohammad Al-Shyoukh, Cedar Park, TX (US); Percy Neyra, Austin, TX (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 169 days.

(21) Appl. No.: 13/672,304

(22) Filed: Nov. 8, 2012

(65) Prior Publication Data

US 2014/0126254 A1 May 8, 2014

(51) Int. Cl.
*H02M 1/36* (2007.01)
*G05F 1/46* (2006.01)
*H02M 1/42* (2007.01)
*H02M 7/5375* (2006.01)

(52) U.S. Cl.
CPC .............. *G05F 1/468* (2013.01); *H02M 1/36* (2013.01); *H02M 1/4258* (2013.01); *Y02B 70/126* (2013.01)

(58) Field of Classification Search
CPC .......... H02M 1/36; H02M 2001/0006; H02M 7/517; H02M 7/5375; H02H 9/001
USPC ......................................... 363/49, 89; 323/901
See application file for complete search history.

(56) References Cited

U.S. PATENT DOCUMENTS

| | | | | |
|---|---|---|---|---|
| 5,459,652 A | * | 10/1995 | Faulk | H02M 1/36 323/901 |
| 5,581,453 A | * | 12/1996 | Ueta | G05F 1/66 363/131 |
| 5,615,097 A | * | 3/1997 | Cross | 363/84 |
| 7,619,397 B2 | | 11/2009 | Al-Shyoukh | |
| 8,629,631 B1 | * | 1/2014 | Rhodes et al. | 315/307 |
| 8,724,352 B2 | * | 5/2014 | Hosotani | H02M 1/36 363/21.02 |
| 2013/0163295 A1 | * | 6/2013 | Lu et al. | 363/44 |

* cited by examiner

*Primary Examiner* — Gary L Laxton
(74) *Attorney, Agent, or Firm* — Hauptman Ham, LLP

(57) ABSTRACT

An AC-DC power converter includes a rectifying unit, an output stage, a controller and a soft-start circuit. The rectifying unit is configured to rectify an AC voltage to a rectified voltage. The output stage is coupled to the rectifying unit and configured to convert the rectified voltage into a DC voltage for a load. The controller is coupled to the output stage and configured to control the output stage. The soft-start circuit is coupled to the rectifying unit to receive the rectified voltage. The soft-start circuit is configured to detect whether the rectified voltage is at or below a predetermined level, and to enable the controller if the rectified voltage is detected to be at or below the predetermined level.

20 Claims, 6 Drawing Sheets

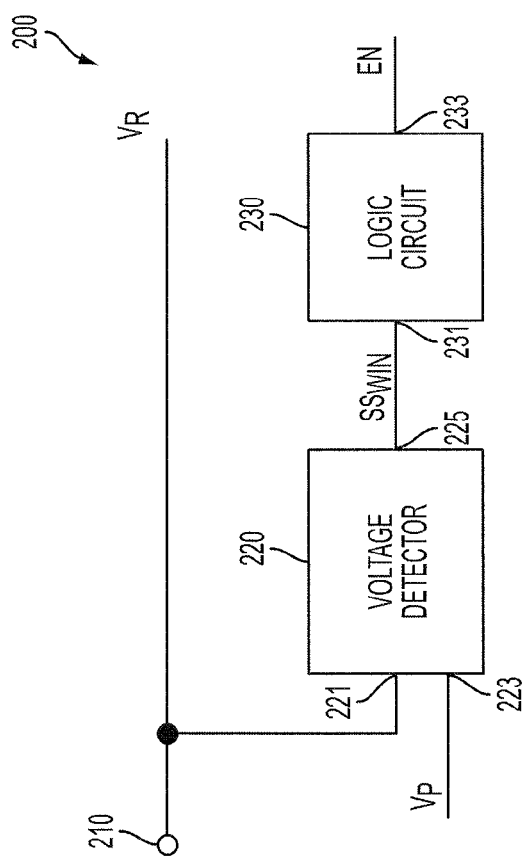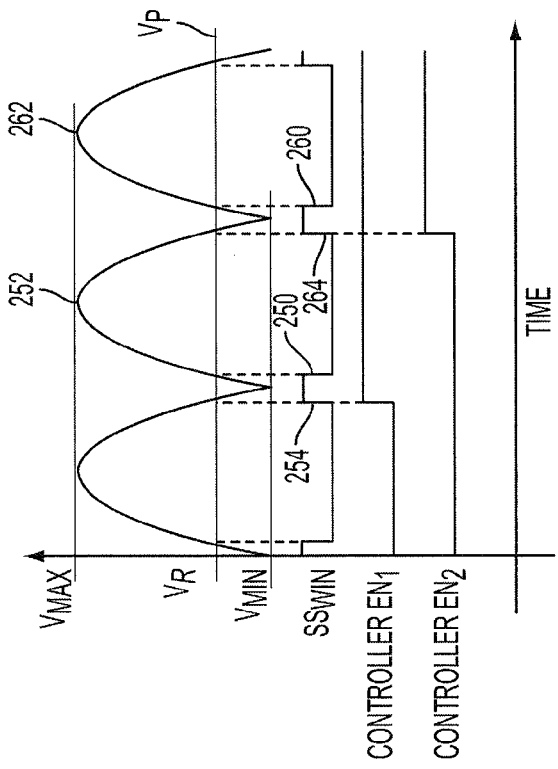
FIG. 2A
FIG. 2B

AC-DC CONVERTERS AND METHOD WITH SOFT-START SCHEME FOR AC-DC CONVERTERS

RELATED APPLICATION(S)

The instant application is related to U.S. patent application Ser. No. 13/598,288, filed Aug. 29, 2012, and titled "START-UP CIRCUIT AND METHOD FOR AC-DC CONVERTERS," the entire content of which is incorporated by reference herein.

BACKGROUND

AC-DC power converters are used in many applications, including consumer electronics, LED lighting, and other kinds of electrical or electronic devices. In a typical application, the AC-DC power converter produces a regulated DC output from an AC input which comes from the utility grid. The regulated DC output is either a voltage as in power supply applications, or a current as in emerging LED lighting applications.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIG. 2A is a schematic circuit diagram and FIG. 2B is a timing diagram of an operation of a soft-start circuit in accordance with some embodiments.

DETAILED DESCRIPTION

Figure 1:
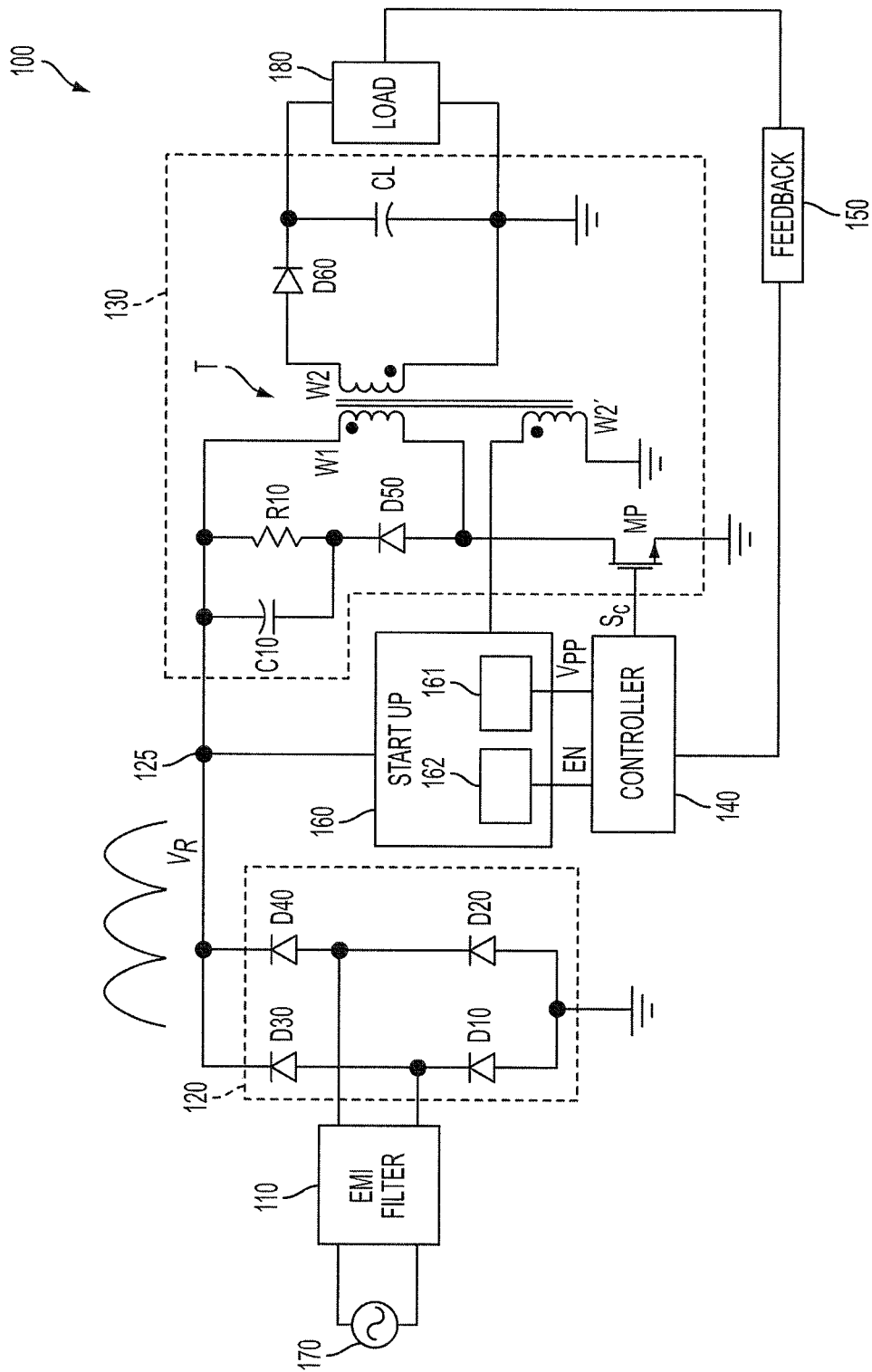
FIG. 1 is a schematic circuit diagram of a power converter in accordance with some embodiments.

It is to be understood that the following disclosure provides many different embodiments or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent; however, that one or more embodiments may be practiced without these specific details. Like reference numerals in the drawings denote like elements.

Some embodiments describe a soft-start scheme for an AC-DC power converter which has an output stage for converting a rectified voltage into output power for a load, and a controller for controlling the output stage. In accordance with the soft-start scheme, the rectified voltage is detected and the controller is enabled when the rectified voltage is low, i.e., at or below a predetermined level. In at least one embodiment, the controller is enabled when the rectified voltage is low and decreasing. As a result, the controller will start the operation of the power converter at a low energy build-up in the output stage, thereby avoiding an excessive release of energy into the load side.

FIG. 1 is a schematic circuit diagram of a power converter 100 in accordance with some embodiments. The power converter 100 includes an electromagnetic interference (EMI) filter 110, a rectifying unit 120, an output stage 130, a controller 140, a feedback circuit 150, and a start-up circuit 160. In some embodiments, the power converter 100 is implemented wholly or partly on a single integrated circuit (also referred to as chip), or on a multi-chip structure. In some embodiments, one or more components of the power converter 100 are configured as discrete components and are mounted on a printed circuit board (PCB) having conductive traces that connect the discrete components to the chip or chips containing the remaining components.

The EMI filter 110 is coupled to a power source 170. In one or more embodiments, the power source 170 is an AC power source, such as the utility grid. The EMI filter 110 includes one or more passive and/or active electronic components configured to suppress EMI from the power source 170 from affecting operation of the other components of the power converter 100. In one or more embodiments, the EMI filter 110 is further configured to provide surge protection for the other components of the power converter 100. In one or more embodiments, the EMI filter 110 is omitted from the power converter 100.

The rectifying unit 120 is coupled to the power source 170, either directly or indirectly via the EMI filter 110, to receive power to be converted. The rectifying unit 120 is configured to output a rectified voltage $V_R$ from the power received from the power source 170. In one or more embodiments, the rectifying unit 120 includes diodes D10-D40 connected with each other to define a full-wave rectifier. Other configurations of the rectifying unit 120 are used in further embodiments.

The output stage 130 is coupled to an output 125 of the rectifying unit 120 and configured to convert, under control of the controller 140, the rectified voltage $V_R$ into a DC voltage for a load 180. The output stage 130 includes a transformer T having a primary winding W1 coupled to the output 125 of the rectifying unit 120 to receive the rectified voltage $V_R$, and at least one secondary winding W2 coupled to the load 180. The transformer T further includes an auxiliary secondary winding W2' to provide power for the controller 140.

On the primary winding (W1) side, the output stage 130 further includes a switch MP (also referred to herein as "power switch MP"), a capacitor C10, a resistor R10 and a diode D50. In one or more embodiments, the switch MP includes a power field-effect transistor (FET), such as a double-diffused metal-oxide-semiconductor (DMOS) transistor. In further embodiments, the switch MP includes one or more other suitable devices, such as an insulated-gate bipolar transistor (IGBT), a field effect transistor (FET), etc. The switch MP has a control terminal coupled to the controller 140 to receive a control signal Sc, and first and second terminals coupled to the ground and the primary winding W1. The primary winding W1 has opposite ends coupled to the rectifying unit 120 and the switch MP. The resistor R10 and diode D50 are coupled in series between the switch MP and the output 125 of the rectifying unit 120. The capacitor 10 is coupled in parallel with the resistor R10.

On the secondary winding (W2) side, the output stage 130 further includes a capacitor CL and a diode D60 which are coupled in series between opposite ends of the secondary winding W2 to form a loop. Other configurations of the output stage 130 are used in further embodiments.

The controller 140 generates the control signal Sc for controlling the switch MP to turn ON or OFF. After the switch MP is turned ON by the controller 140, a current flows from the rectifying unit 120, via the primary winding W1 and the switch MP, to the ground. Thus, energy supplied from the rectifying unit 120 is built up and stored in the primary winding W1. The built up energy is proportional to the ON time of the switch MP and the rectified voltage $V_R$. After the switch MP is turned OFF by the controller 140, the energy stored in the primary winding W1 is released into a load 180 via the secondary winding W2 and the diode D60, with the capacitor CL acting as the load capacitor. The diode D50, capacitor C10 and resistor R10 act as primary-side clamps during the energy release from the primary winding W1 to the secondary winding W2. The use of the transformer T for energy transmission shields the load 180 from perturbations or glitches that are potentially present on the power source 170. In at least one embodiment, a frequency at which the controller 140 turns ON/OFF the switch MP is higher than a frequency of the power source 170. For example, the controller 140 turns ON/OFF the switch MP at about 200 kHz given the power source frequency of about 50 Hz.

The controller 140 further monitors the outputted power, voltage and/or current (hereinafter commonly referred to as "output") of the output stage 130 and controls the ON/OFF switching of the switch MP to maintain the output of the output stage 130 at a desired level. The output of the output stage 130 is detected by the feedback circuit 150 which provides an isolated, or non-isolated, feedback signal that is indicative of the detected output. The feedback signal also allows the controller 140 to detect short circuits or other faults or malfunctions on the load side. In at least one embodiment, the feedback signal is compared with a reference voltage, and the difference (also referred to as "error signal") is amplified by a gain stage of the controller 140 to output an amplified error signal. The amplified error signal is used by the controller 140 to control the ON time and, by extension, the effective switching frequency of the switch MP, via the control signal Sc, to thereby control the output of the output stage 130. At start-up, because the output of the output stage 130 is zero or close to zero, a large error signal is possible which, in turn, possibly results in an excessive release of energy into the load 180. A soft-start scheme is provided in some embodiments to reduce and/or eliminate such excessive transients during starting-up.

The start-up circuit 160 is coupled to the output 125 of the rectifying unit 120, the controller 140, and the auxiliary secondary winding W2' of the transformer T. The start-up circuit 160 comprises a controller power management unit (hereinafter "controller PM") 161 and a soft-start circuit 162. Upon power-up of the power converter 100, the controller PM 161 receives the rectified voltage $V_R$ from the rectifying unit 120, and generates a voltage $V_{PP}$ based on the rectified voltage $V_R$. The voltage $V_{PP}$ is outputted to the controller 140 as a power rail to provide power for operation of the controller 140. However, the voltage $V_{PP}$ alone does not yet start the operation of the controller 140. For this purpose, a controller enabling signal EN is outputted from the soft-start circuit 162 to the controller 140 to start operation of (or enable) the controller 140. Upon receipt of the signal EN and using power provided by the voltage $V_{PP}$, the controller 140 starts the ON/OFF switching of the switch MP. As the switch MP starts switching, the output stage 130 starts outputting power to the load 180 via the secondary winding W2. A portion of the power outputted by the output stage 130 is supplied via the auxiliary secondary winding W2' to the controller PM 161. After the power supplied by the output stage 130 via the auxiliary secondary winding W2' reaches a predetermined level, the controller PM 161 outputs the voltage $V_{PP}$ based on the power supplied by the output stage 130 for powering further operation of the controller 140.

A soft-start circuit 200 in accordance with some embodiments will now be described with reference to FIGS. 2A and 2B. FIG. 2A is a schematic circuit diagram and FIG. 2B is a timing diagram of the operation of the soft-start circuit 200. It should be noted that FIG. 2B is not drawn to scale.

The soft-start circuit 200 is usable as the soft-start circuit 162 in the power converter 100. The soft-start circuit 200 has an input node 210, a voltage detector 220, and a logic circuit (or a logic state machine) 230. The input node 210 is coupled to the output 125 of the rectifying unit 120 to receive the rectified voltage $V_R$ from the rectifying unit 120.

The voltage detector 220 includes a first input 221, a second input 223 and an output 225. The first input 221 of the voltage detector 220 is coupled to the input node 210 to receive the rectified voltage $V_R$ from the rectifying unit 120. The second input 223 of the voltage detector 220 is configured to receive a voltage Vp having a predetermined level. The voltage detector 212 is configured to detect whether the rectified voltage $V_R$ is at or below the predetermined level of the voltage Vp. The voltage detector 220 is further configured to output, at the output 225, a soft-start window signal SSwin if the rectified voltage $V_R$ is detected to be at or below the voltage Vp. For example, as shown in FIG. 2B, if the rectified voltage $V_R$ is at or below the voltage Vp, the signal SSwin is generated by the voltage detector 220 to have a high level. Two full high level pulses 250 and 260 in the signal SSwin are illustrated in FIG. 2B.

The logic circuit 230 has an input 231 and an output 233. The input 231 is coupled to the output 225 of the voltage detector 220 to receive the signal SSwin. The logic circuit 230 is configured to output, at the output 233 and in accordance with the signal SSwin, a signal EN for enabling the controller 140. For example, as shown in FIG. 2B, if the signal SSwin is at the high level, the signal EN is generated by the logic circuit 230 to have a high level and is maintained by the logic circuit 230 at the high level even if the signal SSwin then drops to a low level. The high level signal EN enables the controller 140 to start the ON/OFF switching of the switch MP. It is possible to configure the logic circuit 230 to generate the signal EN of the high level corresponding to any of the high level pulses of the signal SSwin. To start-up the power converter 100 as soon as possible after power-up, the logic circuit 230 in some embodiments is configured to generate the signal EN as soon as possible, for example, corresponding to the first full high level pulse 250 (i.e., signal EN1 in FIG. 2B) or the second full high level pulse 260 (i.e., signal EN2 in FIG. 2B) of the signal SSwin after power-up.

By enabling the controller 140 when the rectified voltage $V_R$ is detected to be at or below the voltage Vp, i.e., when the rectified voltage $V_R$ is low, the controller 140 will start the ON/OFF switching of the power switch MP. The energy buildup in the primary winding W1 is proportional to the rectified voltage $V_R$ and, hence, starting the ON/OFF switching of the power switch MP at a low level of $V_R$ causes small amounts of energy to build up in the primary winding W1 of the transformer T. Thus, even at a high switching frequency (or high switching rate) of the power switch MP, the amount of energy released to the load 180 via the secondary winding W2 is limited by the low level of energy build-up in the primary winding W1 and is unlikely to become excessive. As a result, large transient events are avoidable. Subsequently, as the rectified voltage $V_R$ rises again, the output of the output stage 130 gradually increase to an intended steady-state level, thereby achieving a soft-start of the power converter 100. In at least one embodiment, the voltage Vp is equal to or less than 10% of a maximum voltage level Vmax of the rectified voltage $V_R$. In one or more embodiments, the voltage Vp is 15~20V (volt) which is suitable for power converters operable on the utility grid of 110~220V.

It is possible to configure the soft-start circuit 200 to enable the controller 140 at any time during the period when the rectified voltage $V_R$ decreases from the voltage Vp to a minimum voltage level Vmin of the rectified voltage $V_R$ and then increases from the minimum voltage level Vmin to the voltage Vp. In at least one embodiment, the soft-start circuit 200 is configured to enable the controller 140 when the rectified voltage $V_R$ is decreasing from the predetermined level of the voltage Vp. Such an arrangement provides an effect in that the level of energy build up in the primary winding W1 is not only low, but also decreasing, when the controller 140 starts the ON/OFF switching of the switch MP. Thus, the amount of energy released to the load 180 via the secondary winding W2 is limited by the low and decreasing level of energy build-up in the primary winding W1. As a result, large transient events are avoidable in a reliable manner.

In some embodiments, the output of the output stage 130 reaches the steady-state level by the subsequent peak of the rectified voltage $V_R$ after the controller 140 is enabled. For example, when the controller 140 is enabled corresponding to the first full high level pulse 250, the output of the output stage 130 reaches, or is close to, the steady-state level by a peak 252 of the rectified voltage $V_R$ immediately following the first full high level pulse 250. Similarly, when the controller 140 is enabled corresponding to the second full high level pulse 260, the output of the output stage 130 reaches the steady-state level by a peak 262 of the rectified voltage $V_R$ immediately following the second full high level pulse 260. As the output of the output stage 130 approaches the steady-state level, the feedback signal also increases, the error signal and the amplified error signal decrease, thereby reducing or eliminating the likelihood of large build-ups and releases of energy from the primary winding W1 to the secondary winding W2 and subsequently to the load 180.

In at least one embodiment, to ensure that the output of the output stage 130 reaches the steady-state level by the subsequent peak of the rectified voltage $V_R$, the controller 140 is enabled when the rectified voltage $V_R$ is decreasing from the voltage Vp as described above. This arrangement provides an effect in that the entire rising period of the rectified voltage $V_R$, e.g., from the minimum voltage level Vmin corresponding to the first full high level pulse 250 to the peak 252, is made available for the output stage 130 to build its output to the steady-state level. Thus, enabling the controller 140 when the rectified voltage $V_R$ is decreasing provides various effects.

In at least one embodiment, to reliably enable the controller 140 when the rectified voltage $V_R$ is decreasing from the voltage Vp, the logic circuit 230 is configured to generate the signal EN of the high level on a rising edge of the signal SSwin. For example, to enable the controller 140 corresponding to the first full high level pulse 250, the logic circuit 230 is configured to generate the signal EN1 of the high level on a rising edge 254 of the first full high level pulse 250. Similarly, to enable the controller 140 corresponding to the second full high level pulse 260, the logic circuit 230 is configured to generate the signal EN2 of the high level on a rising edge 264 of the second full high level pulse 260.

In some embodiments, the logic circuit 230 is omitted from the soft-start circuit 200. In such an arrangement, the signal SSwin outputted by the voltage detector 220 functions as a controller enabling signal for enabling the controller 140. In at least one embodiment, the controller 140 is configured to be enabled directly by one of the high level pulses of the signal SSwin. In at least one embodiment, the logic circuit 230 is incorporated in the controller 140 to generate a signal EN in accordance with the signal SSwin and use the signal EN to enable further operation of the controller 140.

Figure 3:
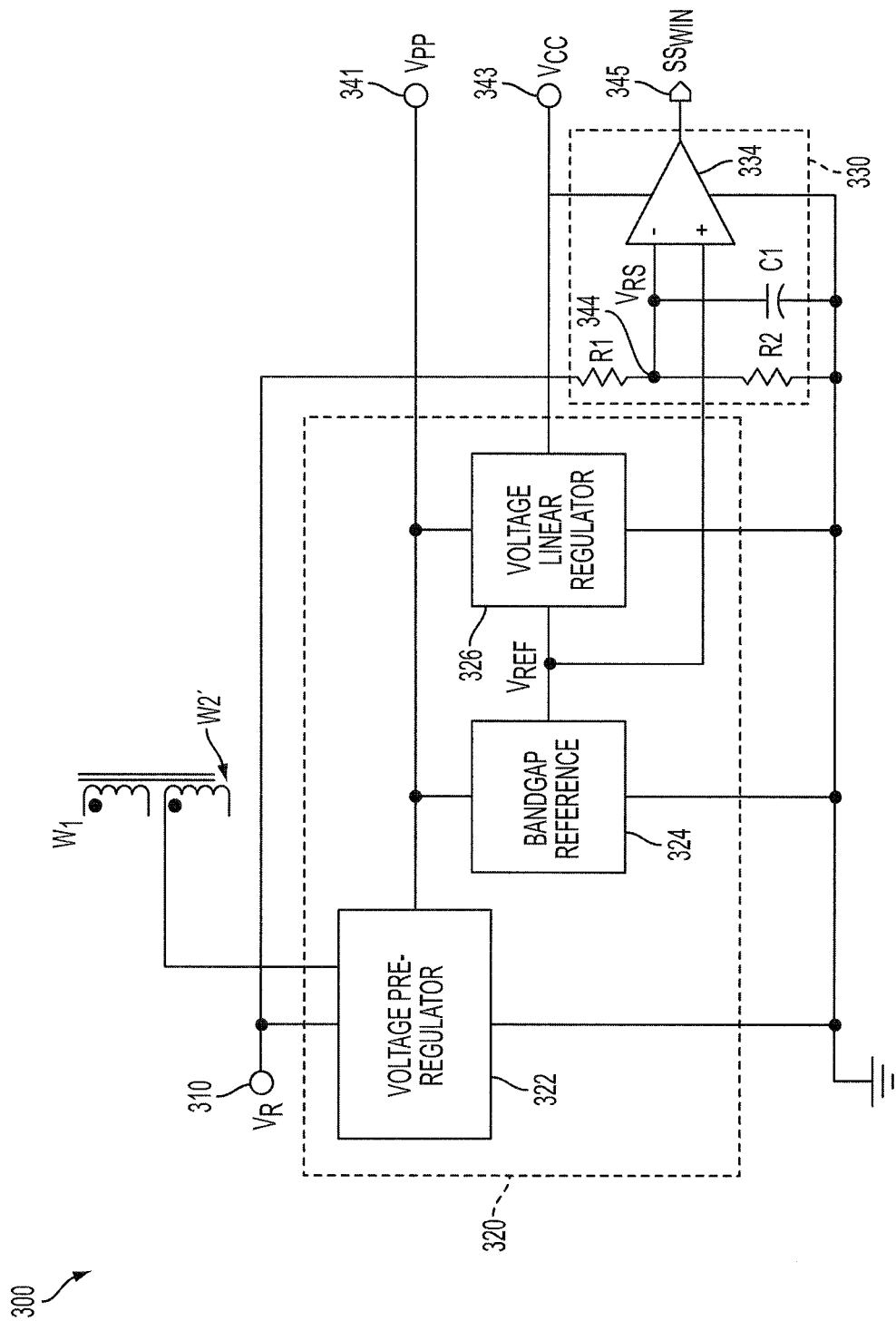
FIG. 3 is a schematic circuit diagram of a start-up circuit in accordance with some embodiments.

FIG. 3 is a schematic circuit diagram of a start-up circuit 300 in accordance with some embodiments. The start-up circuit 300 is usable as the start-up circuit 160 in the power converter 100. The start-up circuit 300 includes an input node 310, a controller PM 320, and a soft-start circuit 330. The controller PM 320 includes a voltage pre-regulator 322, a band-gap reference circuit 324, and a voltage linear regulator 326. The soft-start circuit 330 includes a voltage divider defined by resistors R1 and R2, and a comparator 334.

The input node 310 is coupled to the output 125 of the rectifying unit 120 of the power converter 100. The voltage pre-regulator 322 is coupled to the input node 310 to receive the rectified voltage $V_R$. The voltage pre-regulator 322 is configured to generate the voltage $V_{PP}$ from the rectified voltage $V_R$, and to supply the voltage $V_{PP}$, via an output terminal 341, to the controller 140 as a first power rail for the controller 140. As discussed above, after the start-up stage, when the power supplied by the output stage 130 via the auxiliary secondary winding W2' reaches a predetermined level, the voltage pre-regulator 322 outputs the voltage $V_{PP}$ based on the power supplied by the output stage 130 for powering further operation of the controller 140. In one or more embodiments, the voltage $V_{PP}$ is 15~20V. An example circuit for the voltage pre-regulator 322 in accordance with some embodiments is described in U.S. patent application Ser. No. 13/598,288, filed Aug. 29, 2012, titled "START-UP CIRCUIT AND METHOD FOR AC-DC CONVERTERS," referenced above. Other configurations of the voltage pre-regulator 322 are used in some embodiments.

The band-gap reference circuit 324 is coupled to the output terminal 341 to be powered by the voltage $V_{PP}$ from the voltage pre-regulator 322. The band-gap reference circuit 324 is configured to generate a band-gap reference voltage Vref which remains substantially constant over an intended temperature range and/or despite some variations in the power supply, i.e., in the voltage $V_{PP}$. An example circuit for the band-gap reference circuit 324 will be described with respect to FIG. 5A. Other configurations of the band-gap reference circuit 324 are used in some embodiments. In one or more embodiments, the reference voltage Vref is also used as the reference voltage to be compared with the feedback signal as described above. In one or more embodiments, the band-gap reference circuit 324 is omitted.

The voltage linear regulator 326 has its input power rail coupled to the output terminal 341 to be powered by the voltage $V_{PP}$ from the voltage pre-regulator 322. The voltage linear regulator 326 has an input coupled to an output of the band-gap reference circuit 324 to receive the reference voltage Vref. The voltage linear regulator 326 is configured to generate a voltage Vcc from the reference voltage Vref and to supply the voltage Vcc, via an output terminal 343, to the controller 140 as a second power rail for the controller 140. The second power rail provided by the voltage Vcc has a better quality than the first power rail provided by the voltage $V_{PP}$ which is likely affected by noises on the utility grid and the rectified voltage $V_R$. In one or more embodiments, the voltage Vcc is 3~5V. An example circuit for the voltage linear regulator 326 is described in U.S. Pat. No. 7,619,397 by one of the inventors named in this application. The entire content of U.S. Pat. No. 7,619,397 is incorporated by reference herein. Other configurations of the voltage linear regulator 326 are used in some embodiments. In one or more embodiments, the voltage linear regulator 326 is omitted.

The voltage divider of the soft-start circuit 330 is defined by the resistors R1 and R2 coupled in series between the input node 310 and the ground. The voltage divider is configured to scale-down the rectified voltage $V_R$ to provide a scaled-down voltage Vrs at an intermediate node 344 between the resistors R1 and R2. Other configurations for scaling down the rectified voltage $V_R$ are used in some embodiments.

The comparator 334 is coupled to the output terminal 343 to be powered by the voltage Vcc from the voltage linear regulator 326. The comparator 334 has a first input terminal, e.g., an inverting input terminal, coupled to the intermediate node 344 to receive the scaled-down voltage Vrs. The comparator 334 further has a second input terminal, e.g., a non-inverting input terminal, coupled to the output of the band-gap reference circuit 324 to receive the reference voltage Vref. The comparator 334 is configured to compare the scaled-down voltage Vrs with the reference voltage Vref and, based on the comparison, output the signal SSwin for enabling the controller 140 at an output terminal 345.

The comparator 334 and the voltage divider together perform the function of the voltage detector 220 described with respect to FIG. 2A. More specifically, the scaled-down voltage Vrs corresponds to the rectified voltage $V_R$, and the reference voltage Vref corresponds to the voltage Vp. The resistors R1 and R2 are selected to provide a scaling ratio based on the reference voltage Vref and the voltage Vp. For examiner, when Vp is 10V and Vref is 1V, the resistors R1 and R2 are selected to provide a scaling ratio of 10 (10V/1V) to provide the scaled-down voltage Vrs at a level of 10% of the rectified voltage $V_R$. The signal SSwin outputted based on the comparison between the scaled-down voltage Vrs and the reference voltage Vref corresponds to the signal SSwin outputted based on the comparison between the rectified voltage $V_R$ and the voltage Vp, as described with respect to FIG. 2B.

In some embodiments, the soft-start circuit 330 further includes a logic circuit to generate a controller enabling signal from the signal SSwin, as described with respect to the logic circuit 230 in FIG. 2A. An example circuit for the logic circuit will be described with respect to FIG. 5B.

A capacitor C1 is coupled to the inverting input terminal of the comparator 334 to filtering out high frequency components on the scaled-down voltage Vrs due to corresponding to high frequency components on the rectified voltage $V_R$. As a result, the high frequency components are prevented from causing glitches on the signal SSwin. Other filtering circuits are used in some embodiments. In one or more embodiments, the capacitor C1 is omitted.

In some embodiments, the comparator 334 is configured as a hysteresis comparator to prevent noises on the utility grid, the rectified voltage $V_R$ and/or the scaled-down voltage Vrs from causing glitches on the signal SSwin. In an example circuit, a positive feedback with a resistor that is substantially larger than R1 and R2 is added to the comparator 334 between a logic-inverted version of the output terminal 345 and the non-inverting input terminal of the comparator 334 to configure the comparator 334 as a hysteresis comparator. Other configurations of the hysteresis comparator or other circuits with hysteresis are used in some embodiments.

Figure 4:
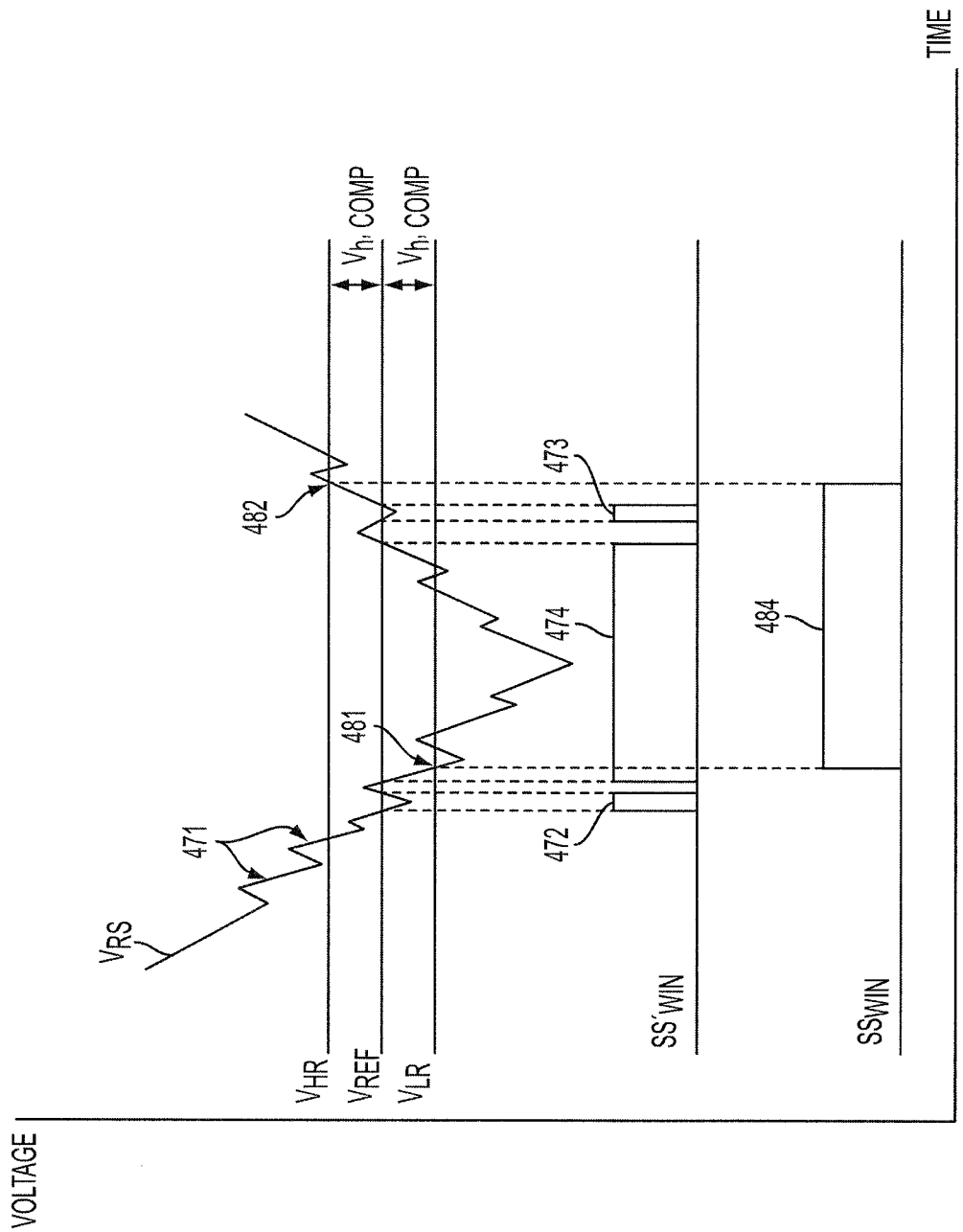
FIG. 4 is a timing diagram of an operation of a hysteresis comparator in accordance with some embodiments.

FIG. 4 is a timing diagram of an operation of a hysteresis comparator in accordance with some embodiments. It should be noted that FIG. 4 is not drawn to scale. The scaled-down voltage Vrs is illustrated in a large scale in FIG. 4 to show noises 471. When a comparator with a single threshold reference voltage Vref is used to detect the scaled-down voltage Vrs, the output of such a comparator switches state every time the scaled-down voltage Vrs crosses the reference voltage Vref, regardless of whether the scaled-down voltage Vrs is rising or falling. The multiple crossings of the scaled-down voltage Vrs relative to the reference voltage Vref potentially cause multiple, irregular pulses 472, 473 in addition to a main pulse 474 in the signal SSwin'. Such irregular pulses 472, 473, or glitches, under certain circumstances, potentially cause the controller 140 to be enabled at the wrong time. For example, if the logic circuit 230 coupled to the output of the comparator misses the main pulse 474, the subsequent irregular pulse 473 is likely to trigger the logic circuit 230 to generate a controller enabling signal EN near the reference voltage Vref and on the rising edge of the scaled-down voltage Vrs. As a result, the controller 140 is likely enabled when the rectified voltage $V_R$ is greater than and increases from the voltage Vp, which will potentially result in excessive energy build-up and release to the load 180.

Such potential events are avoidable by using a hysteresis comparator. The hysteresis comparator has different first and second thresholds $V_{LR}$ and $V_{HR}$. The first threshold $V_{LR}$ is lower than the reference voltage Vref by an internal hysteresis value $V_{h,comp}$ of the hysteresis comparator. The second threshold $V_{HR}$ is higher than the reference voltage Vref by the internal hysteresis value $V_{h,comp}$ of the hysteresis comparator. The output of the hysteresis comparator switches state when the scaled-down voltage Vrs decreases across the first threshold $V_{LR}$ at 481, and when the scaled-down voltage Vrs increases across the second threshold $V_{HR}$ at 482. As a result, a square pulse 484 is generated in the signal SSwin when the scaled-down voltage Vrs decreases from the first threshold $V_{LR}$ to the minimum voltage level Vmin and then rises from the minimum voltage level Vmin to the second threshold $V_{HR}$. The signal SSwin is generated without glitches, thereby ensuring that the controller 140 will be enabled at the right time, i.e., when the rectified voltage $V_R$ is at or below a predetermined level and decreasing. In embodiments where two of more thresholds are used for comparison as described with respect to FIG. 4, the "predetermined level" corresponds to an average value of the thresholds.

In one or more embodiments, a difference between the first threshold $V_{LR}$ (or the second threshold $V_{HR}$) and the reference voltage Vref, i.e., the internal hysteresis value $V_{h,comp}$, is selected to correspond to 5~10V on the rectified voltage $V_R$, taking into account the scaling ratio of the voltage divider. In other words, $V_{h,comp} \times (R1+R2)/R2$ is 5~10V. This range of 5~10V is suitable for effectively preventing noises on the utility grid of 110~220V from causing glitches in the signal SSwin.

Figure 5:
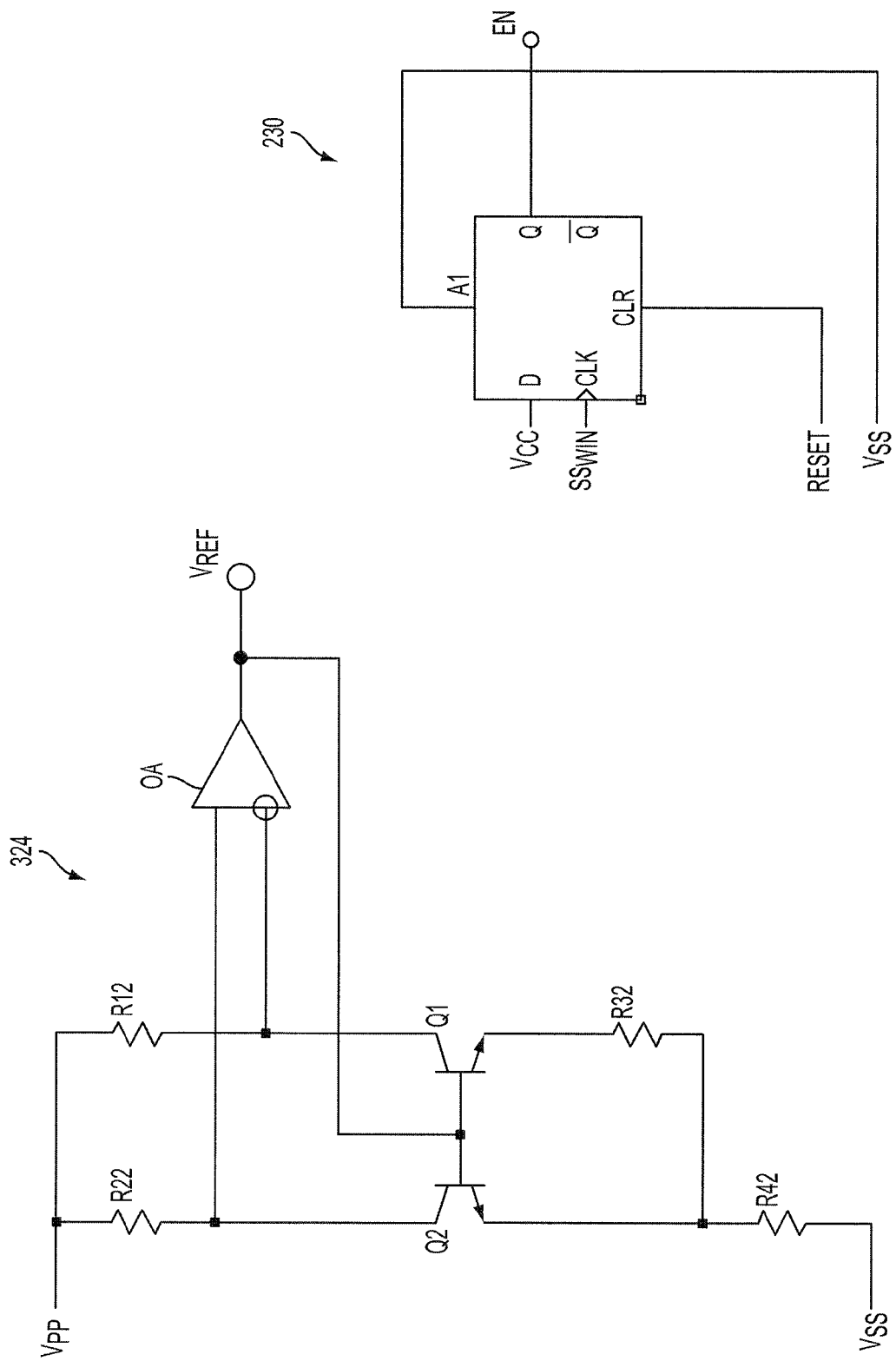
FIGS. 5A and 5B are schematic circuit diagrams of various components in a start-up circuit in accordance with some embodiments.

FIG. 5A is a schematic circuit diagram of an example circuit of the band-gap reference circuit 324 in accordance with some embodiments. The band-gap reference circuit 324 is a Brokaw cell band-gap reference circuit and includes transistors Q1, Q2 having sources and drains coupled between the power supply, i.e., the voltage $V_{PP}$ outputted by the voltage pre-regulator 322, and the ground, i.e., a voltage Vss. A resistor R12 is coupled between the transistor Q1 and the voltage $V_{PP}$. A resistor R22 is coupled between the transistor Q2 and the voltage $V_{PP}$. A resistor R42 is coupled between the transistor Q2 and the voltage Vss. A resistor R32 is coupled between the transistor Q1 and the resistor R42. An operational amplifier OA has a non-inverting input terminal coupled to the drain of the transistor Q2, and an inverting input terminal coupled to the drain of the transistor Q1. An output of the operational amplifier OA is coupled to gates of the transistors Q1 and Q2, and also provides the band-gap reference voltage Vref.

FIG. 5B is a schematic circuit diagram of an example circuit of the logic circuit 230 in accordance with some embodiments. The logic circuit 230 includes a flip-flop A1 having a CLK (clock) terminal coupled to receive the signal SSwin, a D terminal coupled to receive power supply, i.e., the voltage Vcc outputted by the voltage linear regulator 326, a CLR (clear) terminal coupled to receive a Reset signal, and a Q terminal at which the signal EN is outputted. The logic circuit 230 is configured to operate with a power-on reset, i.e., the Reset signal is applied to the CLR terminal of the flip-flop A1 upon power-up. The Q terminal is at a low level when the reset is released. On the first rising edge of the signal SSwin applied to the CLK terminal, the Q terminal is switched to and remains at the high level, thereby generating a controller enabling signal EN of a high level for enabling the controller 140.

Figure 6:
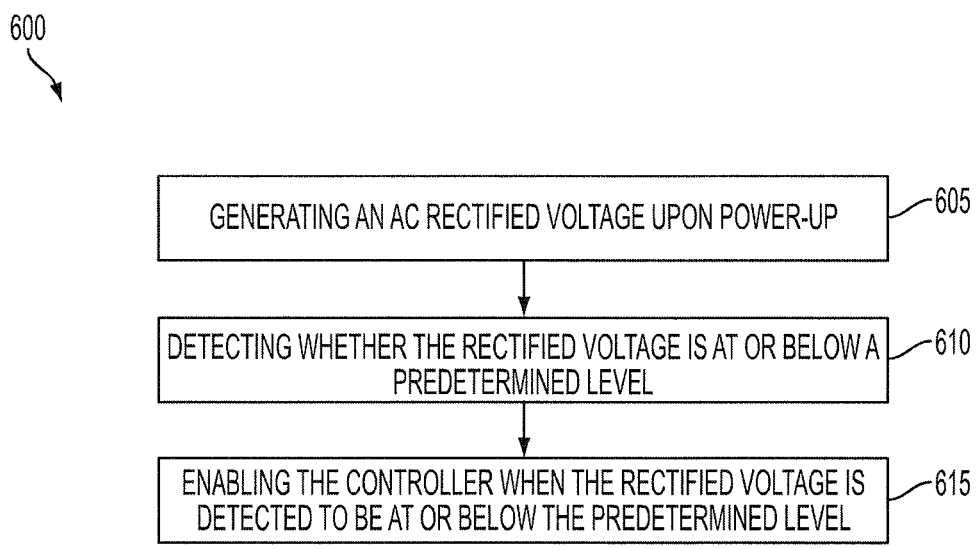
FIG. 6 is a flow chart of a method of soft-starting a power converter in accordance with some embodiments.

FIG. 6 is a flow chart of a method 600 of soft-starting a power converter in accordance with some embodiments. In one or more embodiments, the method is performed by a soft-start circuit, such as the soft-start circuit 200 described with respect to FIGS. 2A-2B, to soft-start a power converter, such as the power converter 100 described with respect to FIG. 1.

At operation 605, an AC rectified voltage is generated upon power-up of the power converter. For example, the rectified voltage $V_R$ is generated upon power-up of the power converter 100, as described with respect to FIG. 1.

At operation 610, it is determined whether the rectified voltage is at or below a predetermined level. For example, a voltage detector 220 is operable to detect whether the rectified voltage $V_R$ is at or below a predetermined level of a voltage Vp as described with respect to FIGS. 2A-2B.

At operation 615, if the rectified voltage is detected to be at or below the predetermined level, a controller enabling signal is supplied to a controller of the power converter to enable the controller. For example, if the rectified voltage $V_R$ is detected to be at or below the voltage Vp, i.e., during the high level pulses of the signal SSwin, a controller enabling signal EN is supplied to a controller 140 of the power converter 100 to enable the controller 140, as described with respect to FIG. 2B.

The above method(s) include(s) example operations, which are not necessarily required to be performed in the order shown and/or described. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to some embodiments, an AC-DC power converter comprises rectifying unit, an output stage, a controller and a soft-start circuit. The rectifying unit is configured to rectify an AC voltage to a rectified voltage. The output stage is coupled to the rectifying unit and configured to convert the rectified voltage into a DC voltage for a load. The controller is coupled to the output stage and configured to control the output stage. The soft-start circuit is coupled to the rectifying unit to receive the rectified voltage. The soft-start circuit is configured to detect whether the rectified voltage is at or below a predetermined level, and to enable the controller if the rectified voltage is detected to be at or below the predetermined level.

According to some embodiments, a start-up circuit for a power converter comprises an input node, a voltage divider, and a hysteresis comparator. The input node is configured to receive a rectified voltage. The voltage divider is coupled to the input node and configured to scale-down the rectified voltage to output a scaled-down rectified voltage. The hysteresis comparator has a first input terminal coupled to the voltage divider to receive the scaled-down rectified voltage, and a second input terminal configured to receive a reference voltage. The hysteresis comparator further has a first threshold lower than the reference voltage, and a second threshold higher than the reference voltage. The hysteresis comparator is configured to output a soft-start window signal for enabling a controller of the power converter during a period when the scaled-down rectified voltage decreases from the first threshold to a minimum voltage level and then rises from the minimum voltage level to the second threshold.

According to some embodiments, in a method of soft-starting a power converter, an AC rectified voltage is generated upon power-up of the power converter. It is detected whether the rectified voltage is at or below a predetermined level. If the rectified voltage is detected to be at or below the predetermined level, a controller enabling signal is supplied to a controller of the power converter to enable the controller.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An AC-DC power converter, comprising:
   a rectifying unit configured to rectify an AC voltage to a rectified voltage;
   an output stage coupled to the rectifying unit and configured to convert the rectified voltage into a DC voltage for a load;
   a controller coupled to the output stage and configured to control the output stage; and
   a soft-start circuit coupled to the rectifying unit to receive the rectified voltage, the soft-start circuit configured to detect whether the rectified voltage is at or below a predetermined level and to enable the controller if the rectified voltage is detected to be at or below the predetermined level.

2. The AC-DC power converter of claim 1, wherein the soft-start circuit is configured to enable the controller if the rectified voltage decreases from the predetermined level.

3. The AC-DC power converter of claim 1, wherein the predetermined level is equal to or less than 10% of a maximum voltage level of the rectified voltage.

4. The AC-DC power converter of claim 1, wherein the predetermined level is 15-20V.

5. The AC-DC power converter of claim 1, wherein the soft-start circuit comprises:
   a voltage detector configured to detect whether the rectified voltage is at or below the predetermined level and to generate a soft-start window signal if the rectified voltage is detected to be at or below the predetermined level, and
   a logic circuit coupled to the voltage detector to receive the soft-start window signal and configured to output a controller enabling signal to the controller in response to the soft-start window signal.

6. The AC-DC power converter of claim 5, wherein the logic circuit is configured to output the controller enabling signal on a rising edge of the soft-start window signal.

7. The AC-DC power converter of claim 1, wherein the soft-start circuit comprises:
a voltage divider coupled to the rectifying unit and configured to scale-down the rectified voltage; and
a comparator coupled to the voltage divider to compare the scaled-down rectified voltage with a reference voltage corresponding to the predetermined level.

8. The AC-DC power converter of claim 7, wherein
the comparator comprises a hysteresis comparator having a first threshold lower than the reference voltage and a second threshold higher than the reference voltage, the hysteresis comparator configured to generate a soft-start window signal corresponding to the scaled-down rectified voltage decreasing from the first threshold to a minimum voltage level and then rising from the minimum voltage level to the second threshold, and
the soft-start circuit further comprises a logic circuit coupled to the hysteresis comparator and configured to supply a controller enabling signal to the controller in response to the soft-start window signal.

9. The AC-DC power converter of claim 8, wherein a difference between (i) the first or second threshold of the hysteresis comparator and (ii) the reference voltage corresponds to 5-10V on the rectified voltage.

10. A method of soft-starting a power converter, the method comprising:
generating an AC rectified voltage upon power-up of the power converter;
detecting whether the rectified voltage is at or below a predetermined level; and
supplying a controller enabling signal to a controller of the power converter to enable the controller if the rectified voltage is detected to be at or below the predetermined level.

11. The method of claim 10, wherein the controller enabling signal is supplied to the controller when the rectified voltage is decreasing from the predetermined level.

12. The method of claim 10, wherein the predetermined level is equal to or less than 10% of a maximum voltage level of the rectified voltage.

13. The method of claim 10, further comprising:
generating a first voltage from the rectified voltage;
supplying the first voltage to the controller to provide a first power rail for the controller;
generating a band-gap reference voltage from the first voltage, the band-gap reference voltage corresponding to the predetermined level; and
using the band-gap reference voltage as a reference voltage to detect whether the rectified voltage is at or below the predetermined level.

14. The method of claim 13, further comprising:
scaling down the rectified voltage;
comparing, by a hysteresis comparator, the scaled-down rectified voltage with the band-gap reference voltage to detect whether the rectified voltage is at or below the predetermined level;
generating a second voltage from the first voltage and the band-gap reference voltage;
supplying the second voltage to the controller to provide a second power rail for the controller; and
powering the hysteresis comparator with the second voltage.

15. A power converter, comprising:
a rectifying unit configured to generate a rectified voltage;
a controller configured to control output of the rectified voltage to a load; and
a start-up circuit, the start-up circuit comprising:
an input node coupled to the rectifying unit and configured to receive the rectified voltage;
a voltage divider coupled to the input node and configured to scale-down the rectified voltage to output a scaled-down rectified voltage; and
a hysteresis comparator having
a first input terminal coupled to the voltage divider to receive the scaled-down rectified voltage,
a second input terminal configured to receive a reference voltage,
a first threshold lower than the reference voltage, and
a second threshold higher than the reference voltage, the hysteresis comparator configured to output a soft-start window signal for enabling the controller of the power converter during a period when the scaled-down rectified voltage decreases from the first threshold to a minimum voltage level and then rises from the minimum voltage level to the second threshold.

16. The power converter of claim 15, wherein the start-up circuit further comprises:
a logic circuit coupled to the hysteresis comparator, the logic circuit configured to receive the soft-start window signal, and configured to output, in response to the soft-start window signal, a controller enabling signal to the controller to enable the controller.

17. The power converter of claim 15, wherein the start-up circuit further comprises:
a capacitor coupled between the first input terminal of the hysteresis comparator and ground.

18. The power converter of claim 15, wherein the start-up circuit further comprises:
a voltage pre-regulator coupled to the input node, the voltage pre-regulator configured to generate a first voltage from the rectified voltage, and configured to supply the first voltage to the controller as a first power rail for the controller.

19. The power converter of claim 18, wherein the start-up circuit further comprises:
a band-gap reference circuit coupled to the voltage pre-regulator and configured to generate a band-gap reference voltage from the first voltage,
wherein the second input terminal of the hysteresis comparator is coupled to the band-gap reference circuit to receive the band-gap reference voltage as the reference voltage.

20. The power converter of claim 19, wherein the start-up circuit further comprises:
a linear regulator coupled to the voltage pre-regulator and the band-gap reference circuit, the linear regulator configured to generate a second voltage from the first voltage and the band-gap reference voltage and configured to supply the second voltage to the controller as a second power rail for the controller,
wherein the hysteresis comparator is coupled to the linear regulator and configured to be powered by the second voltage.

* * * * *